US009058224B2

United States Patent
Sandmel et al.

(10) Patent No.: US 9,058,224 B2
(45) Date of Patent: Jun. 16, 2015

(54) SERIALIZATION OF ASYNCHRONOUS COMMAND STREAMS

(75) Inventors: Jeremy Sandmel, San Mateo, CA (US); Kenneth Christian Dyke, Los Altos, CA (US); Gokhan Avkarogullari, San Jose, CA (US); Richard Schreyer, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 849 days.

(21) Appl. No.: 13/153,346

(22) Filed: Jun. 3, 2011

(65) Prior Publication Data

US 2012/0306899 A1    Dec. 6, 2012

(51) Int. Cl.
| | |
|---|---|
| *G06F 15/16* | (2006.01) |
| *G06T 1/00* | (2006.01) |
| *G06F 9/52* | (2006.01) |
| *G06T 1/20* | (2006.01) |

(52) U.S. Cl.
CPC .............. *G06F 9/52* (2013.01); *G09G 2352/00* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 6,105,057 A  * | 8/2000 | Kuftedjian et al. ........... | 709/213 |
| 6,499,048 B1 | 12/2002 | Williams | |
| 6,510,437 B1 | 1/2003 | Bak et al. | |
| 7,353,515 B1 | 4/2008 | Ton et al. | |
| 7,512,950 B1 | 3/2009 | Marejka | |
| 8,310,491 B2 | 11/2012 | Swift et al. | |
| 2003/0041173 A1* | 2/2003 | Hoyle ........................... | 709/248 |
| 2005/0102681 A1* | 5/2005 | Richardson ................... | 719/321 |
| 2006/0028479 A1* | 2/2006 | Chun et al. .................... | 345/531 |
| 2008/0303834 A1 | 12/2008 | Swift et al. | |
| 2008/0303835 A1 | 12/2008 | Swift et al. | |
| 2008/0303837 A1 | 12/2008 | Swift et al. | |
| 2012/0050301 A1* | 3/2012 | Chun et al. .................... | 345/522 |

* cited by examiner

*Primary Examiner* — Joni Richer
*Assistant Examiner* — Yi Wang
(74) *Attorney, Agent, or Firm* — Blakely, Sokoloff, Taylor & Zafman LLP

(57) ABSTRACT

A plurality of asynchronous command streams are established. A first command stream shares a common resource with a second command stream. A synchronization object is incorporated into the first command stream. A central server arbitrates serialization of the first and second command streams using the synchronization object. The central server arbitrates serialization without direct communication between the first and second command streams.

25 Claims, 7 Drawing Sheets

Synchronization object 701
status: not submitted

Synchronization object 703
status: not processed

Synchronization object 705
status: processed

Fig. 7

SERIALIZATION OF ASYNCHRONOUS COMMAND STREAMS

FIELD OF THE INVENTION

Embodiments of the invention are generally directed toward synchronization of commands, particularly the serialization of asynchronous command streams sharing a common resource.

BACKGROUND

Command streams are frequently used to carry out graphical tasks, such as displaying shapes on a monitor. Commands in the command streams use resources, such as video memory. Multiple command streams may share the same common resource. However, some situations require commands in one command stream to be performed using the common resource before commands in another command stream can be performed. The commands in the two command streams need to be serialized so that they are processed in the correct order.

Existing solutions are limited to a single graphical context, such as OpenGL. Since command streams in other graphical contexts may share a common resource with the OpenGL stream, there is a risk that the commands will not be processed in the proper order, resulting in erroneous behavior and a poor user experience.

SUMMARY

A plurality of asynchronous command streams are established. A first command stream shares a common resource with a second command stream. A synchronization object is incorporated into the first command stream. A central server arbitrates serialization of the first and second command streams using the synchronization object. The central server arbitrates serialization without direct communication between the first and second command streams.

DESCRIPTION OF THE DRAWINGS

The present invention is illustrated by way of example and not limitation in the figures of the accompanying drawings in which like references indicate similar elements.

FIG. 7 is a diagram illustrating different states of synchronization objects according to an embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
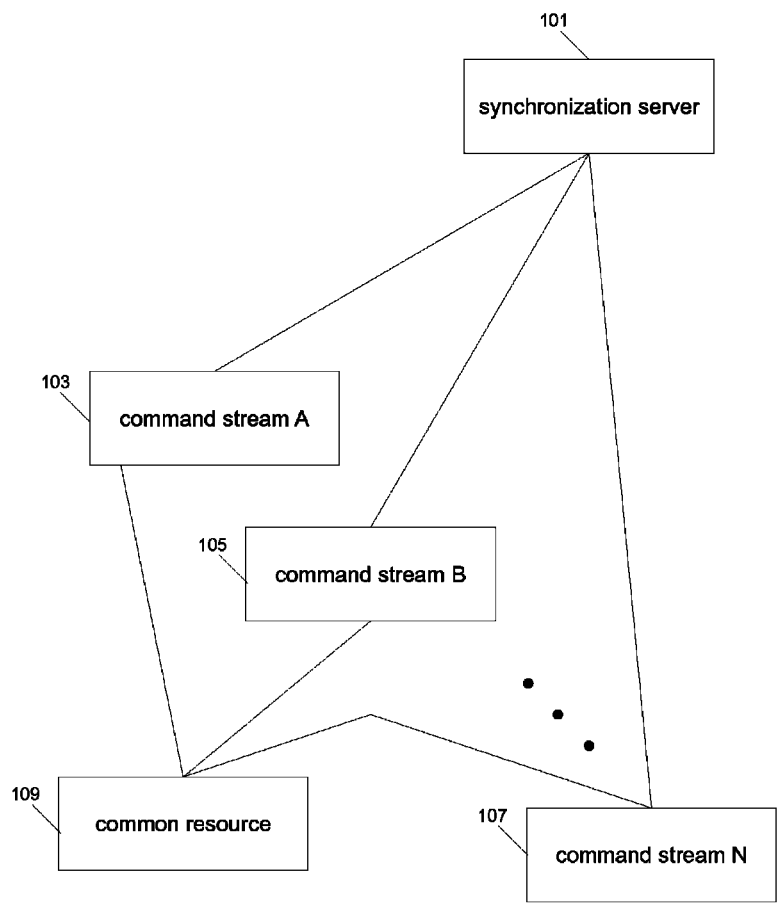
FIG. 1 is a diagram illustrating a system level view of an embodiment of serialization of asynchronous command streams.

FIG. 1 is a diagram illustrating a system level view of serialization of asynchronous command streams. Synchronization server 101 communicates with one or more asynchronous command streams 103-107. Each command stream may include commands that require access to common resource 109. To synchronize access to common resource 109, synchronization server 101 monitors synchronization objects included in command streams 103-107. A synchronization object may be set in command stream 103 and tested in command stream 105. Generally, a synchronization object is set in a command stream to provide an indication of when commands preceding the synchronization objects have been completed. For example, command stream 103 may include a command to draw a rectangle followed by a command setting a synchronization object in the command stream. When the command stream is subsequently processed by a processing device (e.g., GPU, CPU, etc.), the processing device may interact with the synchronization object to indicate that it has been reached and considered by the processing device.

In other embodiments, no centralized server is used. In these embodiments, devices may update predefined locations in memory using hardware or software locks based on a predefined protocol or through the use of a hardware switchboard.

In another embodiment, a synchronization object is used for a beginning-to-beginning dependency. That is, the synchronization object is inserted into a command stream before the operation being monitored.

Figure 2:
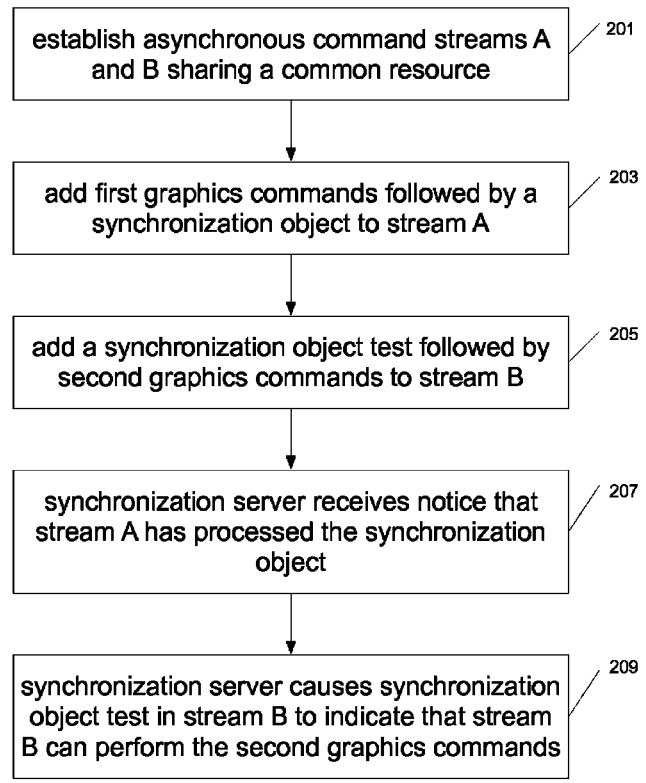
FIG. 2 is a flow chart illustrating a method of serializing asynchronous command streams according to an embodiment of the invention.

FIG. 2 is a flow chart illustrating a method of serializing asynchronous command streams. This method may be performed by a central processing unit (CPU) of a data processing system, a graphics processing unit, stand-alone hardware, or other processing device.

At block 201, the method establishes asynchronous command streams A and B. The streams A and B may share a common resource, such as a region of graphics memory. At block 203, the method adds first graphics commands followed by a synchronization object to command stream A. The command stream A may be in any graphics context. For example, the command stream may be in the context of OpenGL, Quicktime, display command streams, scaler command streams, etc. The synchronization object may be localized to the specific graphics context as is described below in conjunction with FIG. 4.

In some embodiments, command streams associated with a scaler, the display, an image or video decoder, and a camera pipeline may use serialization of asynchronous command streams. In another embodiment, any asynchronous processor may utilize serialization of asynchronous command streams.

Generally, the synchronization object is placed in the command stream at a point after which the command stream has completed its use of the common resource. For example, if the command stream A had four drawing commands using the common resource and three drawing commands not using the common resource, the synchronization object may be set in the command stream after the first four commands but before the last three commands. In this way, the command stream indicates through the synchronization object when commands related to the common resource have been completed.

At block 205, the method adds a synchronization object test followed by second graphics commands to command stream B. A synchronization object test is a request sent to the synchronization server which requests information as to whether or not the current state of the synchronization object indicates that commands in other command streams that depend on the common resource have been completed. The synchronization server may reply to the request with an indication of whether the command stream may proceed with commands dependent on the common resource. In some embodiments, the command stream B may test the synchronization object at certain time intervals. If the synchronization object test indicates that the other command stream still requires the common resource, then the command stream B may perform commands unrelated to the common resource.

At block 207, the synchronization server receives notice that the command stream A has processed the synchronization object. In one embodiment, this notice is generated when a processing device performing the commands in command stream A (e.g., GPU) has reached the synchronization object in the command stream. For example, a method associated with the synchronization object may be called by the processing device when the processing device encounters the synchronization object in the command stream. In response to the processing device calling the method associated with the synchronization object, the state of the synchronization object changes to indicate that command stream A has completed processing a set of commands dependent on the common resource.

At block 209, the synchronization server receives a synchronization object test from command stream B. If command stream A has processed the synchronization object when the synchronization server receives the test from command stream B, the synchronization server indicates to command stream B that command stream B may begin processing commands dependent on the common resource. If command stream A has not processed the synchronization object when the synchronization server receives the test request from command stream B, then the synchronization server responds to the test with an indication that command stream B may not process commands dependent on the common resource corresponding to the synchronization object. As described above, in some embodiments, command stream B may perform other operations unrelated to the common resource until the test returns successfully, or command stream B may wait for a period of time and test the synchronization object again.

Figure 3:
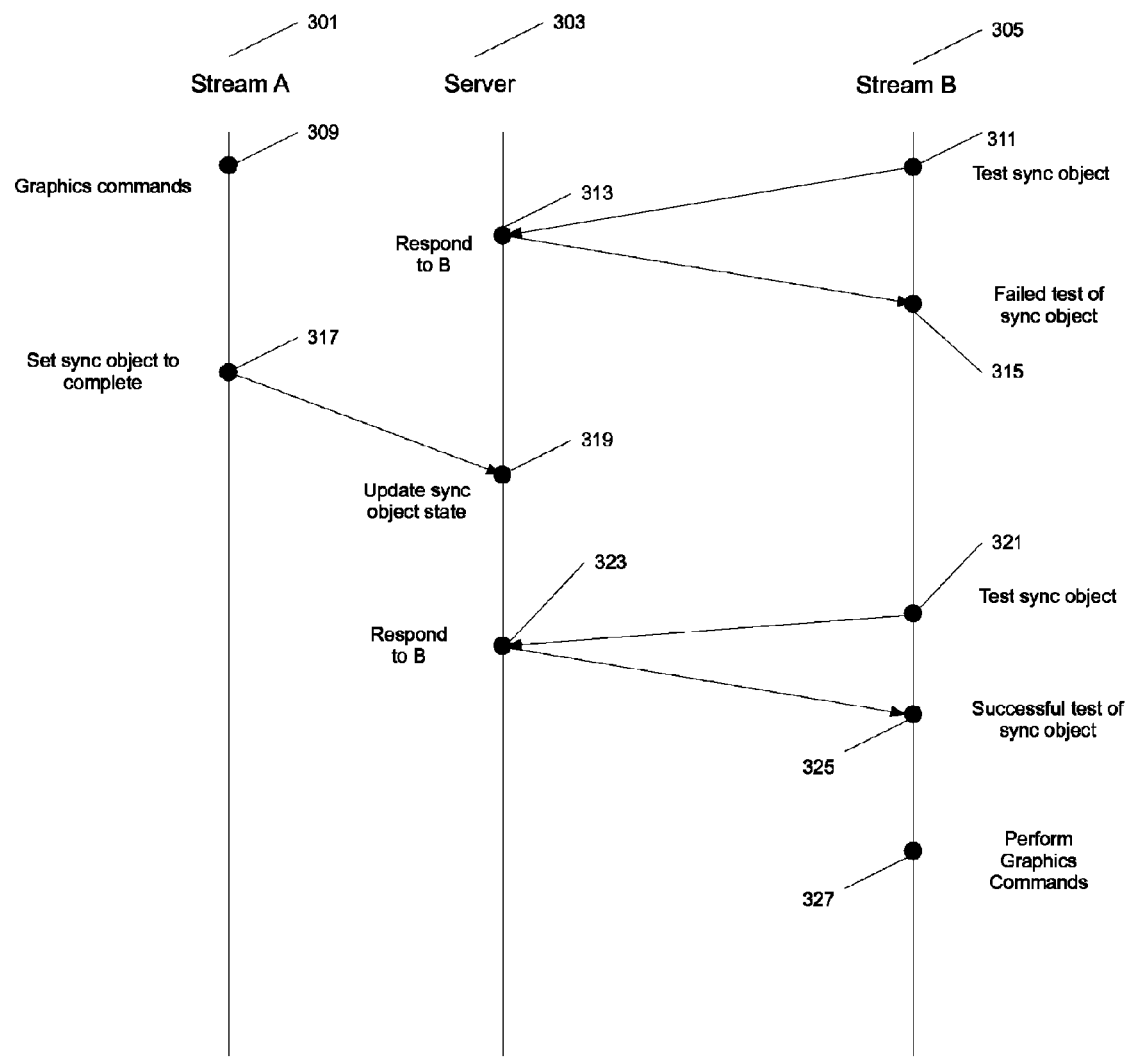
FIG. 3 is a timing diagram illustrating an example of serialization of asynchronous command streams according to an embodiment of the invention.

FIG. 3 is a timing diagram illustrating interactions between a stream A 301 and server 303 and a stream B 305 and server 303. Time progresses in the downward direction.

At time 309, graphics commands in stream A are processed by a processing device such as a GPU. At time 311, a sync object test in stream B is processed which causes a request to be sent to server 303. At time 313, server 303 responds to the device processing commands in stream B. At time 315, stream B receives the failed test of the sync object. The test failed because until time 317, the sync object in stream A has not been processed by the device processing commands in stream A. As a result, stream B is unable to process commands that depend on a common resource shared with stream A, since the common resource is inaccessible to stream B until after stream A has processed the sync object at time 317.

At time 319, server receives an indication that stream A has reached the sync object and has completed the commands dependent on the common resource. In another embodiment, server 303 does not receive an indication that stream A has reached the sync object. Rather, in this embodiment, server 303 determines the state of the sync object only when the sync object is tested by a test request originating in another command stream (e.g., stream B).

At time 321, the device processing commands in stream B again tests the sync object to determine if the common resource is available to commands in stream B. At time 323, the server responds to the test from stream B. At time 325, stream B receives a response to the test indicating that the synchronization object has been processed by stream A and that commands from stream B may now access the common resource, represented at time 327.

In one embodiment, asynchronous notifications are used to indicate that a synchronization object has been processed. This may be accomplished by registering synchronization objects with a synchronization server. The registered objects may include all objects or a subset of all objects. Registration may also be performed automatically when a synchronization object is checked for state and is not available.

Figure 4:
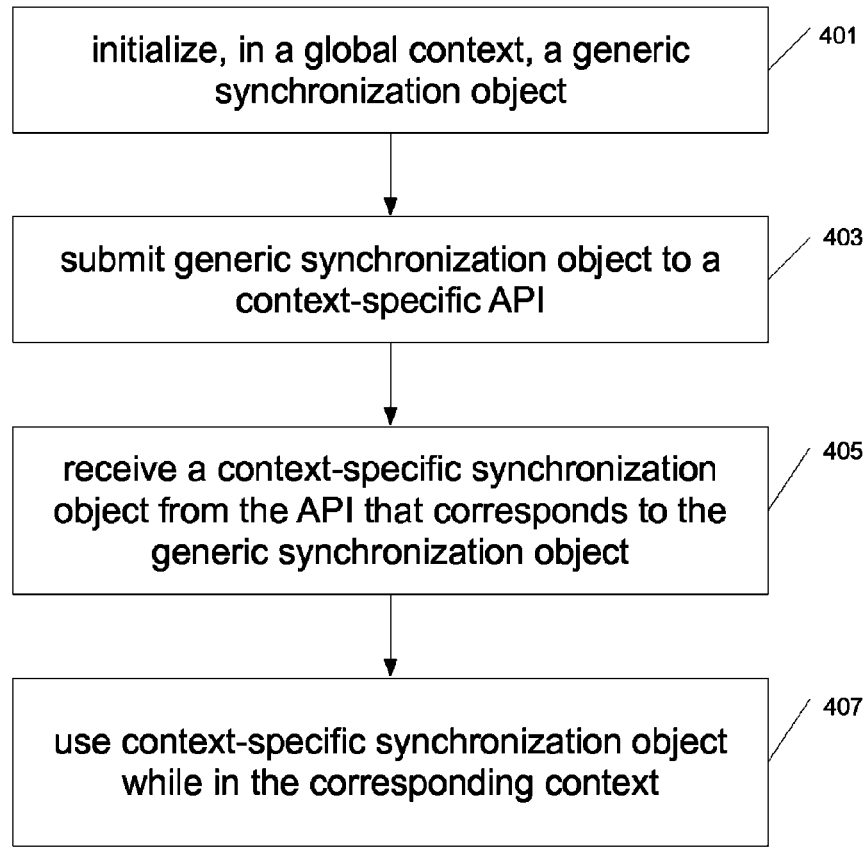
FIG. 4 is a flow chart illustrating a method of localizing synchronization objects according to an embodiment of the invention.

FIG. 4 is a flow chart illustrating a method of localizing a synchronization object for a particular graphics context. In one embodiment, synchronization objects are created globally and are not specific to a particular graphics context. The globally created synchronization objects are managed by the synchronization server. The application programmer interface (API) for each graphics context that will use the synchronization objects may implement a context-specific set of methods, functions, and/or object types for using the global synchronization objects inside the specific graphics context.

At block 401, the method initializes, in a global context, a generic synchronization object. The generic synchronization object is the basic data structure used to serialize asynchronous command streams sharing a common resource. At block 403, the method submits the generic synchronization object to a context-specific API. For example, in the OpenGL context, a function in the OpenGL context that converts a generic synchronization object into an OpenGL synchronization object may be called at block 403. At block 405, the return value of the function may be an OpenGL synchronization object. Other techniques known in the art may be used to perform the conversion. At block 407, the method uses the context-specific synchronization object while in the corresponding context. For example, a command stream in the OpenGL context may place the OpenGL synchronization object in the command stream after a series of graphics commands. In another example, another command stream in the OpenGL context may require a successful test of the value of an OpenGL synchronization before processing certain commands that depend on a common resource to which the synchronization object is used to serialize access.

In one embodiment, a generic synchronization object may be created in a global context and used by two streams using different graphics contexts. For example, the first stream may be in the OpenGL context and the second stream may be in the Quicktime context. In both streams, API-specific commands may be used to create separate, context-specific sync objects using the generic synchronization object. While each stream perform tasks (e.g., test object, place object in stream, process object) on different, context-specific objects, the tasks are reflected in the generic object, allowing the central server to serialize the asynchronous command streams sharing a common resource despite the streams existing in different graphics contexts.

Figure 5:
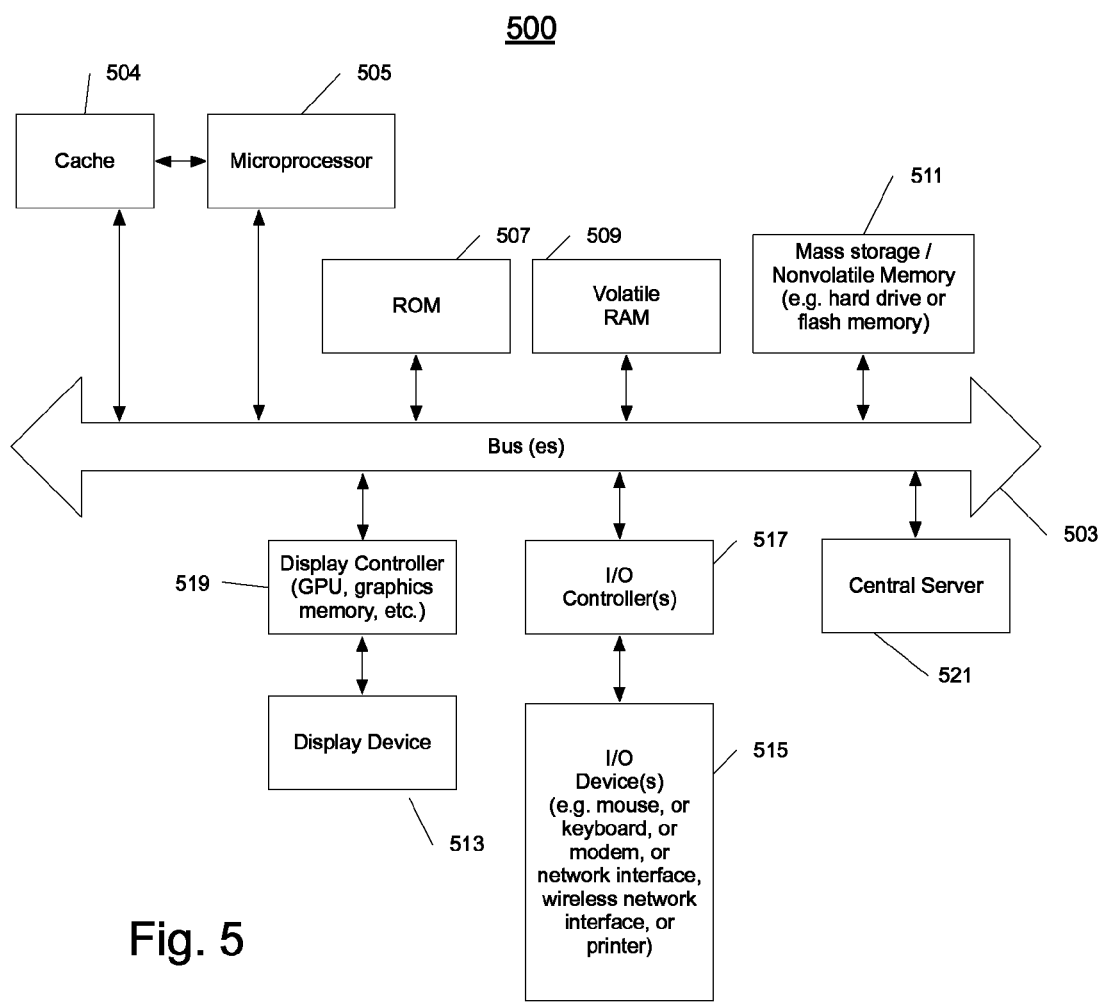
FIG. 5 is a diagram illustrating a data processing system that may be used with an embodiment of the invention.

FIG. 5 shows an example of a data processing system, which may be used with embodiments the present invention. Note that while FIG. 5 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 is coupled to cache 504. The microprocessor 505 may retrieve the instructions from the memories 507, 509, 511 and execute the instructions to perform operations described above. The bus 503 interconnects these various components together and also interconnects these components 505, 507, 509, and 511 to a display controller 519 and a display device 513 and to peripheral devices such as input/output (I/O) devices which may be mice, touch screens, touch pads, touch sensitive input devices, keyboards, modems, network interfaces, printers and other devices which are well known in the art.

Display controller 519 may include a graphics processing unit (GPU), graphics memory (e.g., RAM), and other components. In some embodiments of the invention, instructions are executed by the GPU which cause the GPU to act as a central server for serializing command streams in different graphics contexts. In another embodiment, central server 521 is a stand-alone hardware device coupled to the display controller 519 and microprocessor 505 (e.g., CPU) through bus 503. In still other embodiments of the invention, instructions are executed by microprocessor 505 which provide the functionality of a central server. In yet another embodiment of the invention, one or more of the microprocessor 505, display controller 519, and central server 521 provide portions of the functionality of a central server that serializes asynchronous command streams sharing a common resource.

Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory. Various embodiments of the invention may utilize tangible storage media such as DRAM, disk drives, flash drives, and other types of tangible storage. Non-transitory storage media may be used as well, including DRAM, disk drives, flash drives, etc.

The mass storage 511 is typically a magnetic hard drive or a magnetic optical drive or an optical drive or a DVD RAM or a flash memory or other types of memory systems which maintain data (e.g., large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
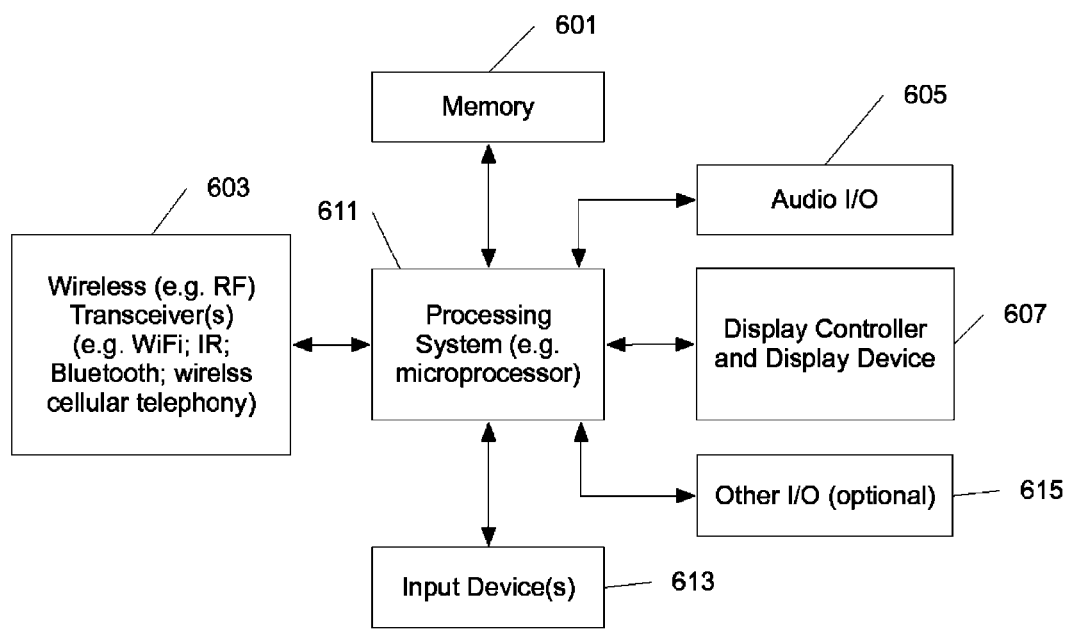
FIG. 6 is a diagram illustrating a device that may be used with an embodiment of the invention.

FIG. 6 shows an example of another data processing system which may be used with one embodiment of the present invention. The data processing system 600 shown in FIG. 6 includes a processing system 611, which may be one or more microprocessors, or which may be a system on a chip integrated circuit, and the system also includes memory 601 for storing data and programs for execution by the processing system. The system 600 also includes an audio input/output subsystem 605 which may include a microphone and a speaker for, for example, playing back music or providing telephone functionality through the speaker and microphone.

A display controller and display device 607 provide a visual user interface for the user; this digital interface may include a graphical user interface which is similar to that shown on a Macintosh computer when running OS X operating system software. The system 600 also includes one or more wireless transceivers 603. A wireless transceiver may be a WiFi transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 6 may also be used in a data processing system.

In some embodiments of the invention, one or more of processing system 611, display controller 607, and a central server (not shown) provide serialization functionality in a manner similar to that described above in conjunction with FIG. 5.

The data processing system 600 also includes one or more input devices 613 which are provided to allow a user to provide input to the system. These input devices may be a keypad or a keyboard or a touch panel or a multi touch panel. The data processing system 600 also includes an optional input/output device 615 which may be a connector for a dock. It will be appreciated that one or more buses, not shown, may be used to interconnect the various components as is well known in the art. The data processing system shown in FIG. 6 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 600 may be a network computer or an embedded processing device within another device, or other types of data processing systems which have fewer components or perhaps more components than that shown in FIG. 6.

FIG. 7 illustrates three synchronization objects 701, 703, and 705. Object 701 has a status of "not submitted." This status indicates that object 701 has not been submitted to any command streams. When object 701 is tested in a command stream, it will return the "not submitted" status. This status is distinguished from the "not processed" status of object 703. The "not processed" status of object 703 indicates that while object 703 has not yet been processed in a command stream, it has been submitted to a command stream. If a different command stream is testing object 703 and receives an indication that the status of object 703 is "not processed," the command stream can wait for a period of time and then test the status of object 703 again until its status changes to "processed."

Since object 703 has been submitted, eventually the command stream to which object 703 has been submitted will process object 703 and the status of object 703 will change to "processed" as in object 705. Thus, another command stream testing object 703 can rely on the status eventually changing to "processed," thereby allowing the command stream testing object 703 to process commands that are prevented from processing until after object 703 has been processed. By contrast, the status "not submitted" does not imply a guarantee that the status will eventually change to "processed," since the object 701 has not been submitted to a command stream and may never be processed.

In the foregoing specification, serialization of asynchronous command streams sharing a common resource has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    establishing a plurality of asynchronous command streams, wherein a first command stream shares a common resource with a second command stream, the first command stream having commands that use the common resource before commands in the second command stream use the common resource, the first and second command streams being processed substantially simultaneously;
    incorporating a synchronization object in the first command stream after the commands that use the common resource in the first command stream, the synchronization object changing status when processed by a first processing device to indicate the common resource is available, wherein the synchronization object is a graphics-context-specific synchronization object that has been converted from an instance of a generic synchronization object managed by a central server before being incorporated into the first command stream;
    incorporating a synchronization object test in the second command stream before the commands that use the common resource in the second command stream, the synchronization object test to request availability of the common resource when processed;
    requesting, from the central server, the availability of the common resource by a second processing device when processing the synchronization object test; and
    receiving, from the central server by the second processing device, an indication of the availability of the common resource based on the status of the synchronization object.

2. The method of claim 1, wherein the plurality of asynchronous command streams includes at least two command streams operating in different graphics contexts.

3. The method of claim 2, wherein the different graphics contexts includes one or more of the following graphics contexts: OpenGL, Quicktime, and JPEG.

4. The method of claim 1, further comprising:
    sending, to the central server from the first processing device, a notification that the synchronization object has been processed.

5. The method of claim 1, wherein the status of the synchronization object is one of the following:
    not submitted to a command stream, not yet processed in a command stream, and finished processing in a command stream.

6. A non-transitory machine readable storage medium storing executable instructions which when executed by a processor cause the processor to perform a method, the method comprising:
    registering, by a synchronization server, a synchronization object associated with a common resource shared among at least two command streams, the synchronization object including a status with an initial value and the at least two command streams being processed substantially simultaneously;
    sending, by the synchronization server, the initial value to a first device processing graphics commands in a first command stream in response to receiving a first request for the status of the synchronization object when the synchronization object has not been submitted to a command stream, the first command stream containing at least one synchronization object test inserted in the first command stream before commands that use the common resource in the first command stream, the at least one synchronization object test to send a status request when processed;
    changing, by the synchronization server, the status of the synchronization object from the initial value to an intermediate value in response to receiving a first indication from a second device processing graphics commands in a second command stream containing the synchronization object inserted in the second command stream after commands using the common resource in the second command stream, the first indication indicating that the second device has not processed the synchronization object in the second command stream;
    sending, by the synchronization server, the intermediate value to the first device in response to receiving a second request for the status of the synchronization object when the second device has not processed the synchronization object;
    changing, by the synchronization server, the status of the synchronization object from the intermediate value to a final value in response to receiving a second indication from the second device, the second indication indicating that the second device has processed the synchronization object in the second command stream; and
    sending, by the synchronization server, the final value to the first device in response to receiving a third request for the status of the synchronization object when the second device has processed the synchronization object.

7. The non-transitory machine readable storage medium of claim 6, wherein the first command stream includes commands from a first graphics context and the second command stream includes commands from a second graphics context.

8. The non-transitory machine readable storage medium of claim 7, wherein the first graphics context is OpenGL.

9. The non-transitory machine readable storage medium of claim 6, wherein the processor is a stand-alone hardware component communicating with at least one of a graphics processing unit and a central processing unit through a bus.

10. The non-transitory machine readable storage medium of claim 6, wherein the initial value indicates to the first device that the synchronization object has not been submitted in a command stream.

11. The non-transitory machine readable storage medium of claim 10, wherein the intermediate value indicates to the first device that the synchronization object has been submitted to a command stream but has not been processed.

12. The non-transitory machine readable storage medium of claim 11, wherein the final value indicates to the first device that the synchronization object has been processed in a command stream.

13. The non-transitory machine readable storage medium of claim 12, wherein the first device processes a first set of commands in response to receiving one of the initial state and the intermediate state, and wherein the first device processes a second set of commands that use the common resource in response to receiving the final state.

14. A non-transitory machine readable storage medium storing executable instructions which when executed by a processor cause the processor to perform a method, the method comprising:

establishing a plurality of asynchronous command streams, wherein a first command stream shares a common resource with a second command stream, the first command stream having commands that use the common resource before commands in the second command stream use the common resource, the first and second command streams being processed substantially simultaneously;

incorporating a synchronization object in the first command stream after the commands that use the common resource in the first command stream, the synchronization object changing status when processed by a first processing device to indicate the common resource is available, wherein the synchronization object is a graphics-context-specific synchronization object that has been converted from an instance of a generic synchronization object managed by a central server before being incorporated into the first command stream;

incorporating a synchronization object test in the second command stream before the commands that use the common resource in the second command stream, the synchronization object test to request availability of the common resource when processed;

requesting, from the central server, the availability of the common resource by a second processing device when processing the synchronization object test; and receiving, from the central server, by the second processing device, an indication of the availability of the common resource based on the status of the synchronization object.

15. The non-transitory machine readable storage medium of claim 14, wherein the plurality of asynchronous command streams includes at least two command streams operating in different graphics contexts.

16. The non-transitory machine readable storage medium of claim 15, wherein the different graphics contexts includes one or more of the following graphics contexts: OpenGL, Quicktime, and JPEG.

17. The non-transitory machine readable storage medium of claim 14, further comprising:

sending, to the central server from the first processing device, a notification that the synchronization object has been processed.

18. A method comprising:

registering, by a synchronization server, a synchronization object associated with a common resource shared among at least two command streams, the synchronization object including a status with an initial value and the at least two command streams being processed substantially simultaneously;

sending, by the synchronization server, the initial value to a first device processing graphics commands in a first command stream in response to receiving a first request for the status of the synchronization object when the synchronization object has not yet been submitted to a command stream, the first command stream containing at least one synchronization object test inserted in the first command stream before commands that use the common resource in the first command stream, the at least one synchronization object test to send a status request when processed;

changing, by the synchronization server, the status of the synchronization object from the initial value to an intermediate value in response to receiving a first indication from a second device processing graphics commands in a second command stream containing the synchronization object inserted in the second command stream after commands using the common resource in the second command stream, the first indication indicating that the second device has not processed the synchronization object in the second command stream;

sending, by the synchronization server, the intermediate value to the first device in response to receiving a second request for the status of the synchronization object when the second device has not processed the synchronization object;

changing, by the synchronization server, the status of the synchronization object from the intermediate value to a final value in response to receiving a second indication from the second device, the second indication indicating that the second device has processed the synchronization object in the second command stream; and sending, by the synchronization server, the final value to the first device in response to receiving a third request for the status of the synchronization object when the second device has processed the synchronization object.

19. The method of claim 18, wherein the first command stream includes commands from a first graphics context and the second command stream includes commands from a second graphics context.

20. The method of claim 18, wherein the initial value indicates to the first device that the synchronization object has not been submitted to a command stream.

21. The method of claim 20, wherein the intermediate value indicates to the first device that the synchronization object has been submitted to a command stream but has not been processed.

22. The method of claim 21, wherein the final value indicates to the first device that the synchronization object has been processed in a command stream.

23. The method of claim 22, wherein the first device processes a first set of commands in response to receiving one of the initial state and the intermediate state, and wherein the first device processes a second set of commands that use the common resource in response to receiving the final state.

24. A data processing system comprising:

means for establishing a plurality of asynchronous command streams, wherein a first command stream shares a common resource with a second command stream, the first command stream having commands that use the common resource before commands in the second command stream use the common resource, the first and second command streams being processed substantially simultaneously;

means for incorporating a synchronization object in the first command stream after the commands that use the common resource in the first command stream, the synchronization object changing status when processed by a first processing device to indicate the common resource is available, wherein the synchronization object is a graphics-context-specific synchronization object that has been converted from an instance of a generic synchronization object managed by a central server before being incorporated into the first command stream;

means for incorporating a synchronization object test in the second command stream before the commands that use the common resource in the second command stream, the synchronization object test to request availability of the common resource when processed;

means for requesting the availability of the common resource from the central server when a second processing device processes the synchronization object test; and means for receiving an indication of the availability of the common resource from the central server by the second processing device, the indication of the availability of the common resource based on the status of the synchronization object.

25. A data processing system comprising:

means for registering a synchronization object by a synchronization server, the synchronization object associated with a common resource shared among at least two command streams and including a status with an initial value, the at least two command streams being processed substantially simultaneously;

means for sending, by the synchronization server, the initial state to a first device processing graphics commands in a first command stream in response to receiving a first request for the status of the synchronization object when the synchronization object has not been submitted to a command stream, the first command stream containing at least one synchronization object test inserted in the first command stream before commands that use the common resource in the first command stream, the at least one synchronization object test to send a status request when processed;

means for changing, by the synchronization server, the status of the synchronization object from the initial value to an intermediate value in response to receiving a first indication from a second device processing graphics commands in a second command stream containing the synchronization object inserted in the second command stream after commands using the common resource in the second command stream, the first indication indicating that the second device has not processed the synchronization object in the second command stream;

means for sending, by the synchronization server, the intermediate value to the first device in response to receiving a second request for the status of the synchronization object when the second device has not processed the synchronization object;

means for changing, by the synchronization server, the status of the synchronization object from the intermediate value to a final value in response to receiving a second indication from the second device, the second indication indicating that the second device has processed the synchronization object in the command stream; and means for sending, by the synchronization server, the final value to the first device in response to receiving a third request for the status of the synchronization object when the second device has processed the synchronization object.

* * * * *